US008126298B2

(12) United States Patent
Stark

(10) Patent No.: US 8,126,298 B2
(45) Date of Patent: Feb. 28, 2012

(54) TRANSMISSION DEVICE

(75) Inventor: Markus Stark, Waizendorf (DE)

(73) Assignee: Siemens Aktiengesellschaft, Munich (DE)

( * ) Notice: Subject to any disclaimer, the term of this patent is extended or adjusted under 35 U.S.C. 154(b) by 978 days.

(21) Appl. No.: 12/107,555

(22) Filed: Apr. 22, 2008

(65) Prior Publication Data

US 2008/0305753 A1 Dec. 11, 2008

(30) Foreign Application Priority Data

Apr. 27, 2007 (DE) ......................... 10 2007 020 013

(51) Int. Cl.
*G02B 6/26* (2006.01)

(52) U.S. Cl. ......................................................... 385/26

(58) Field of Classification Search ..................... 385/26
See application file for complete search history.

(56) References Cited

U.S. PATENT DOCUMENTS

| | | | | |
|---|---|---|---|---|
| 4,259,584 | A | 3/1981 | Krumme | |
| 4,555,631 | A | 11/1985 | Martens | |
| 5,354,993 | A * | 10/1994 | Kedmi et al. | 250/551 |
| 6,937,787 | B2 | 8/2005 | Schilling et al. | |
| 7,599,467 | B2 * | 10/2009 | Popescu | 378/21 |
| 2007/0242798 | A1 * | 10/2007 | Popescu | 378/21 |

FOREIGN PATENT DOCUMENTS

| | | | |
|---|---|---|---|
| DE | 28 46 526 | A1 | 5/1980 |
| DE | 32 05 065 | A1 | 8/1983 |
| DE | 42 18 692 | A1 | 3/1993 |
| DE | 103 02 435 | B3 | 7/2004 |
| DE | 10 2005 027 632 | A1 | 10/2006 |

OTHER PUBLICATIONS

German Office Action dated Jan. 4, 2008 with English translation.

* cited by examiner

*Primary Examiner* — Sung Pak

(74) *Attorney, Agent, or Firm* — Lempia Summerfield Katz LLC

(57) ABSTRACT

A transmission device is provided. The transmission device is operable to transmit data between a rotor and a stator. The transmission device includes at least two pairs of transmission units with one transmission unit embodied as a transmitter and one as a receiver.

16 Claims, 5 Drawing Sheets

TRANSMISSION DEVICE

This patent document claims the benefit of DE 10 2007 020 013.9, filed Apr. 27, 2007, which is hereby incorporated by reference.

BACKGROUND

The present embodiments relate to transmission of data between a rotor and a stator.

Data may be wirelessly transmitted between system parts rotating in relation to one another, for example, in rotation machines of power stations, large motors, radar systems or computer tomography systems. A transmitter or receiver is arranged on the rotor and stator, respectively. The data is transmitted between the rotor and stator optically or capacitively. If there is an area in the vicinity of the axis of rotation of the rotor not available for data transmission, since for example—as in a computer tomography system—this must remain empty, the data transmission takes place in the radially outer area of the rotor. Data transmission that takes place in the radially outer area of the rotor imposes greater demands on the device for transmission of data with respect to the communication link between transmitter and receiver. The data rate to be transmitted may continue to increase, since image processing systems operate with data streams of up to $10^{11}$ bits/second.

DE 28 46 526 A1 discloses using an optical fiber as an extended receiver. Light is guided at least partly in the optical fiber to the receiver being coupled into this conductor from the side by introduction of discontinuities. The optical fiber may be implemented as a circle segment or as a complete loop. When one or more transmitter elements are used, an uninterruptible transmission is guaranteed during a rotational movement of the rotor. Once light has been coupled into the optical fiber, the light is partly coupled out again at its discontinuities, so that, depending on the length of the conductor through which it passes, more or less light gets lost for the transmission.

DE 32 05 065 A1 discloses a receive element in the form of an annular reflective valley. Light, which is routed to a receive unit via multiple reflection, can be coupled into this valley in an almost tangential direction at any angular position. Implementing this type of reflective valley is complicated and cost-intensive. Absorption in the reflective valley may cause losses in the systems.

To keep such transmission power losses low, DE 42 18 692 A1 discloses a number of transmitter units and receiver units that are located opposite one another directly or by a mirror in the transmission position. The transmitter and receiver unit have a practically tangential orientation. The number of transmitter and receiver units may be small with a large free internal diameter. A phase jump may occur in data transmission during a switch between a transmit unit currently involved in transmission and a subsequent transmit unit—on account of the greater distance between the subsequent transmit unit and the receiver unit. The maximum transmissible data rate is restricted. To compensate for the phase jump, DE 103 02 435 A1 discloses a repeated transmission of data bits, which is controlled by a control unit.

SUMMARY AND DESCRIPTION

The present embodiments may obviate one or more of the problems inherent in the related art. For example, in one embodiment, a device for transmission of data between a rotor and a stator may transmit high data rates, for example over $10^9$ bits/second, in a low-loss and reliable manner.

In one embodiment, a transmission device for transmission of data between a rotor and a stator includes at least two pairs of transmission units with one pair of transmission units being a transmitter and the other pair being a receiver. One pair is arranged on the rotor and the other pair is disposed on the stator.

The pairs of transmission units are arranged so that with a rotating rotor, at a handover time, both transmission units of one pair, which are moving towards each other, and transmission units of the other pair, which are moving away from each other, are located in a transmission position relative to one another. The data transmission may be switched or handed over from a pair of transmission units for which the transmission units are moving away from one another to a subsequent pair of transmission units for which the transmission units are getting closer to each other. A handover time in relation to the phase position of the data stream may be selected in which a phase shift does not cause a problem, for example, since it occurs at the end of a data packet or at most is small. A data stream may be transferred at a high data rate.

The handover time lies (occurs) within a time range in which both pairs of transmission units are in a transmission position in relation to each other, and may be selected by a control unit. The data transmission may be disturbed as little as possible. The control unit may be a data processing unit. Alternatively, the control unit may be a mechanical device which controls a switchover of the data transmission from one pair of transmission units to the next. Alternatively, the control unit is removed, for example, if one pair of transmission units leaves a transmission area and the next pair of transmission units simultaneously or shortly beforehand enters a transmission area and takes over the transmission without switching over.

A transmission device may be a simple transmitter, a simple receiver, a transmitter or receiver operating on a number of channels simultaneously or in succession or a combination of a transmitter with a receiver (transceiver). The two pairs of transmission units may be separate or share the use of one transmission unit, for example, a receiver. Two transmitters and one receiver may form the two pairs of transmission units. The transmission units may be provided for optical analog or digital data transmission. A capacitive data transmission may be provided, for example, with two semi-circular shaped lines being laid around the rotor. A small antenna on the rotor, in the vicinity of the lines, may capture the capacitive signals for each position of the rotor. The transmission position is a position of the transmission units in relation to one another intended for data transmission. In the transmission position, the transmission units are connected directly or via one or more beam deflection elements, such as mirrors or such like, for data transmission.

In one embodiment, the transmission device includes a control unit. The control unit alternates one pair of transmission units with transmission units moving towards each other and one pair of transmission units with transmission units moving away from each other for data transmission. The changes in the distances between the transmission units of the pairs of transmission units in relation to each other at the time of transmission are opposing, so that the handover time is set so that the distances or the optical paths between the pairs of transmission units of the two pairs of transmission units are similar or the same. A phase shift may be kept small or avoided, depending on how the signal processing times or signal delay times are in the transmitter or receiver.

When the signal processing times or signal delay times are the same in the transmitters and in the receivers of the pairs of transmission units, the handover time is controlled so that the transmission units of the two pairs of transmission units are at the same distance away from each other at the handover time. A phase jump caused by the handover may be avoided. The distance may be the optical path between a receiver and a transmitter. The optical path may be a direct path or routed via beam deflection elements. If the signal processing times or signal delay times between the transmission units of one transmitter pair and between the transmission units of the other transmitter pair are not equal, the time difference may be taken into account during the switchover so that no phase jump actually occurs.

In one embodiment, the transmission device includes a position sensor. The position sensor detects a relative position of the rotor in relation to the stator. The control unit controls the handover time as a function of a signal of the position sensor. Depending on the arrangement of the transmitters and receivers on the rotor or stator, the distances between the transmitters and the receivers are defined by the relative position of the rotor in relation to the stator. A handover point, which will disturb the data transmission as little as possible, may be selected by evaluating the signal of the position sensor.

The control unit may determine the handover point. The control unit may control the handover point as a function of a relative phase position between the transmitted signals of the pairs of transmission units, for example, with phase equality. The control unit causes both pairs of transmission units to transmit data during an overlap period in which the pairs of transmission units are in the transmit position and evaluating the two received data streams. For example, if the time offset of the two data streams in relation to each other disappears, there is phase equality, and the control unit can set the handover time to this time.

Depending on the type of data transmission, other times can also be selected (set). For example, if the transmission of a data packet is completed shortly before the point of phase equality, then—since the measured phase angle is small, the handover time may be selected before phase equality. Selecting a handover time before phase equality may prevent adversely affecting a subsequent data packet.

A combination of position sensors and measured phase angle may be used in the determination of a suitable transmission time via (using) the control unit.

At least one transmitter may emit a transmit beam in and against the direction of rotation of the rotor. The transmit signal may be emitted in a number of directions if the transmitter is an optical transmitter and emitted with a beam splitter or a beam spread. For example, a two-dimensional transmit beam may be spread as a fan shape. At least one receiver may be an optical receiver that receives a transmit signal from the direction of rotation of the rotor and against this direction.

The transmit beam sent out and collimated from the transmitter may be deflected by one or more optical elements to the respective receiver or a moveable element of the receiver. At least one transmitter may include a beam deflection element moveable in relation to the rotor and the stator. The beam deflection element may deflect the data-carrier transmit beam into the other transmission unit of the pair of transmission units. The control unit may control the movement of the beam deflection element as a function of the relative position of the rotor in relation to that of the stator.

The beam deflection element may deflect the beam in and against the direction of rotation of the rotor or for receiving a beam coming from and against the direction of rotation.

The beam deflection element may be a transmission unit, such as a beam generation element or beam receiving element. The beam deflection element may be moveable in relation to a beam generator element or beam receiver element of the transmission unit. The beam generator element or beam receiver element may not move in relation to the stator or the rotor.

In one embodiment, the beam deflection element may rotate around an axis that is parallel to the axis of rotation of the rotor. The beam generation element and the beam receiving element of a pair of transmission units may lie in a plane perpendicular to the axis of rotation of the rotor. The movability, especially only one-dimensional, of the beam deflection element is sufficient.

The beam deflection element may be rotated around an axis that differs in direction from the axis of rotation of the rotor. A beam deflection from the beam generator element to the beam receiver element may take place if the beam generator element and the beam receiver element do not lie in a plane perpendicular to the axis of rotation of the rotor. The axis that differs in direction from the axis of rotation of the rotor may be perpendicular to the axis of rotation of the rotor. The beam and deflection element may be moved in two or more degrees of freedom, for example, for adjusting the data-carrying beam.

In one embodiment, a control unit may align the beam deflection element with a closed-loop control circuit. The beam deflection element may be aligned for optimum transmission efficiency. Undesired relative movement between system parts caused by temperature variations can be compensated for so that especially an optimum transmission of the data stream is always guaranteed. The transmission efficiency may be a signal strength or signal quality of the data-carrying signal. The optimum transmission efficiency may be a local efficiency maximum.

The beam deflection element may be aligned during operation into a position that provides good transmission efficiency. The control unit may be self-learning, such that the control unit determines optimal alignments of the beam deflection element for the respective angular position of the rotor and controls an alignment of the beam deflection element in accordance with the angular position of the rotor. The angle may be determined during a calibration process separate from operation or during operation of the device.

The self-learning process may be repeated at predetermined intervals. The device may be adapted to environmental conditions which may have changed, such as temperature, form or position changes. The time intervals may be stored in the control unit which can execute the self-learning process independently.

In one embodiment, transmission units of a pair of transmission units are arranged in different planes running perpendicularly to the axis of rotation of the rotor. The transmitter or receiver may cover a large angular range, for example, if one or more beam deflection elements are used to guarantee a high transmission efficiency.

The control unit may transmit at least two different data channels, for example, sequentially over at least one transmission unit of the pair of transmission units. Because of the fact that the data transmission for one data channel only occurs in a specific circle segment of the system, other segments may be used for the parallel transmission of further data streams. In a system with a number of transmitters, each transmitter may transmit another data channel in each segment. Instead of, or in addition to, sequential transmission, a number of data channels via one transmission unit may be transmitted in parallel. The data channels may be different data streams with different or the same data rates, for example, 10 Gbit/s for a picture transmission and 1 Gbit/s for the transmission of control data.

The data channels may use the same carrier frequency. At least one transmission unit of the pair of transmission units may be prepared for transmission of at least two data channels of a different carrier frequency. A frequency multiplex enables an especially high data stream or a number of data streams to be transmitted simultaneously.

DETAILED DESCRIPTION

Figure 1:
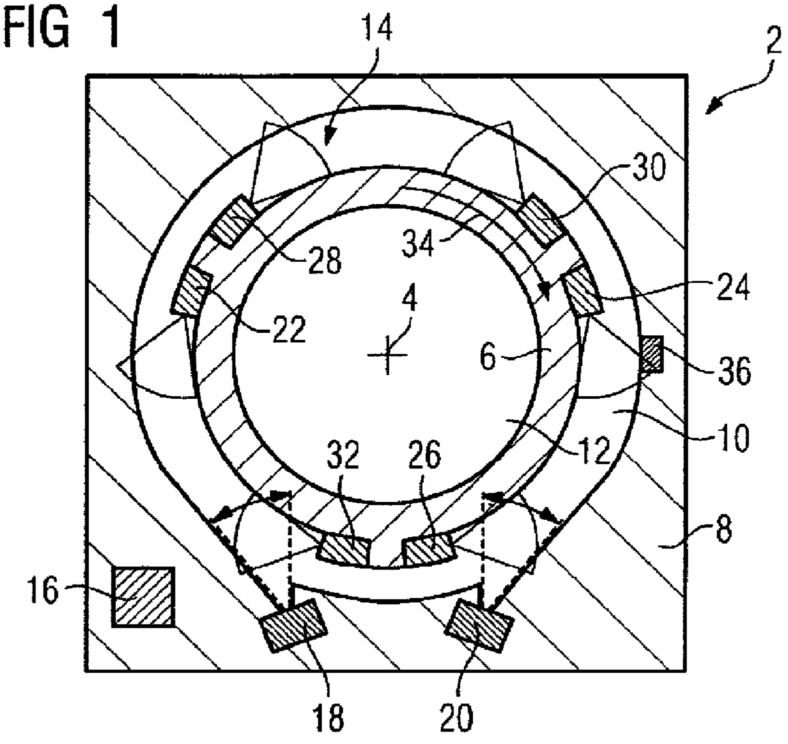
FIG. 1 illustrates one embodiment of a computer tomography system with a stator and a rotor and a transmission device for transmission of data between the stator and the rotor.

FIG. 1 shows a computer tomography system 2. FIG. 1 is a schematic cross-sectional view that is perpendicular to the axis of rotation 4 of the rotor 6 of the computer tomography system. The rotor 6 is surrounded by a schematically-depicted stator 8, which is separated from the rotor 6, by an air gap 10. Inside the rotor 6 is a hollow space 12, which surrounds the axis of rotation 4 for supporting a patient.

During a treatment of the patient, the rotor 6, which includes a radiation device, is rotated around the axis of rotation 4 to record fluoroscopy images of the patient. The image data is transmitted to the stator 8. In the reverse direction, control data, which is for movement of the rotor 6 and for control of images to be recorded, is transmitted from the stator 8 to the rotor 6. For transmission of the control data and image data, the computer tomography system 2 includes a transmission device 14 for transmission of data between the rotor 6 and the stator 8. The transmission device 14 includes a control unit 16 for control of data transmission, two transmission units 18, 20 attached to the stator 8 for transmission of data from and to rotor 6, and six transmission units 22, 24, 26, 28, 30, 32 attached to the rotor for transmission of data to the transmission units 18, of the stator 8. For example, the transmission units 18, 20 may be receivers and the transmission units 22 to 32 may be transmitters, with the reverse function being equally conceivable or the transmission units 18 to 32 being transceivers for transmitting and receiving data.

A transmit source or beam generation element may be an LED (light emitting diode). The transmit source or beam generation element may be a laser diode, with a vertical cavity service emitting laser (VCSEL) which is a semiconductor laser in which light is emitted perpendicular to the plane of the semiconductor chip. Alternatively, the transmit source or beam generation element may be a conventional edge emitter, in which the light exits at one or two edges of the semiconductor chip. External modulators may be integrated for the transmission of high data rates.

The rotor 6 may rotate around its axis of rotation 4 in a direction of rotation 34 relative to the stator 8 for a data transmission. For example, the transmitter 22 may be initially transmitting. The data carrier medium may carry, for example, light, or with a capacitive transmission other electromagnetic radiation, such that the light or electromagnetic radiation is received by the transmission unit 18. The data carrier medium may emit the light, such that it is spread out in a fan shape, so that, two-dimensionally, the light covers a surface over a predetermined angle, for example, 60° in FIG. 1. The spread in spatial direction orthogonal to the fan may be, for example, by 5° for simple adjustment or in a rotation symmetry, for example, equally wide in both spatial directions.

The receive range of the transmitter may, but does not have to, cover a two- or three-dimensional spatial segment, as indicated in FIG. 1 by the double arrow on the transmission units 18, 20. The two transmission units 18, 22 forming a pair of transmission units remain during the rotation of the rotor 6 in a specific time interval in a transmission position in relation to one another, for example, in a setting which is provided for data transmission between the transmission units 18, 22.

If the transmission units 22, 24 reach the position depicted in FIG. 1 in which the distance between the transmission units 18, 22 is the same as the distance between the transmission units 20, 24, a data transmission may be handed over (transferred) from the pair consisting of transmission units 18, 22 to the pair of transmission units with the transmission units 22, 24. At such a handover point, the transmission units 18, 22, 20, 24 of the two pairs of transmission units may be at the same distance from each other. A phase jump in the transmitted data stream may be avoided, since a transmission path between the transmission units 18, 22 and 20, 24 or their respective beam generation element of beam receiving element is the same size. The pair of transmission units consisting of transmission units 20, 24 can now continue data transmission up to a later point in time as depicted in FIG. 2.

Figure 2:
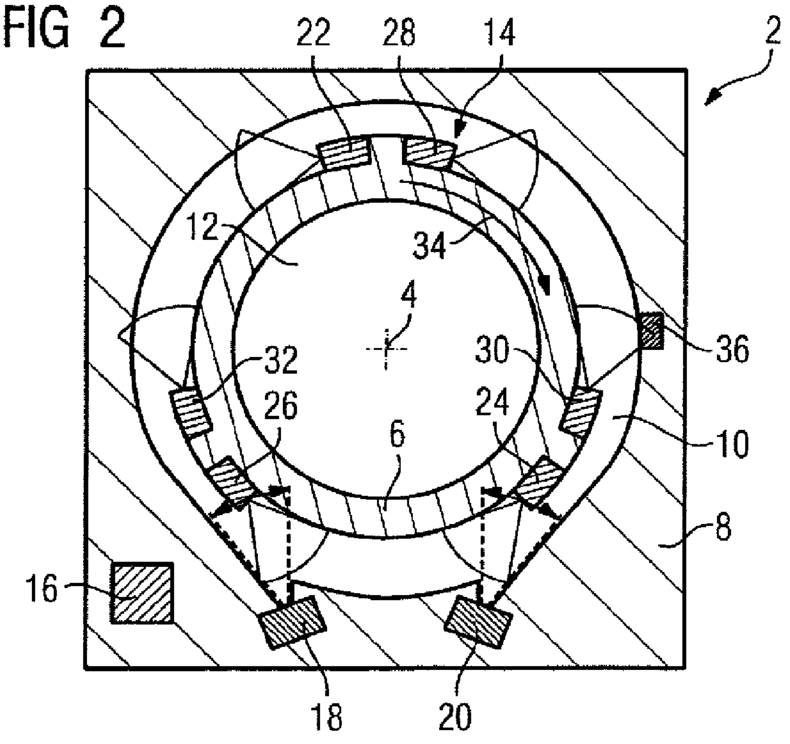
FIG. 2 shows the computer tomography system from FIG. 1 with the rotor rotated slightly in relation to the stator.

As shown in FIG. 2, the transmission units 20, 24 may be in a transmission position relative to each other. The two transmission units forming a new pair of transmission units 18, 26 may move into a transmission position in relation to each other. The distances between the transmission units 18, 26 and 20, 24 of the two pairs of transmission units in relation to each other may be the same, such that this point in time is a new, suitable handover time for handing over the data transmission from the transmission units 20, 24 to the transmission units 26. From this point (time) on, transmission units 18, 26 transmit the data stream. The transmission units 20, 28 form a new pair of transmission units transmitting the data stream.

The data stream may be transmitted by a pair of transmission units with transmission units 20, 24, 28, 32 moving towards each other and then by a pair of transmission units with transmission units 18, 22, 30, 26 moving away from each other. The control of this alternating data transmission is undertaken by the control unit 16. To detect the position of the rotor 6 relative to the stator 8, the stator 8 includes a position sensor 36 that is connected to the control unit 16 and on the basis of the signals of which the control unit 16 determines suitable handover times for handing over the data stream from a pair of transmission units to the next pair of transmission units.

Transmission units 22-32, which are not currently involved in the data transmission, may for the time during which they are not required for data transmission, be switched off by the control unit 16.

Figure 3:
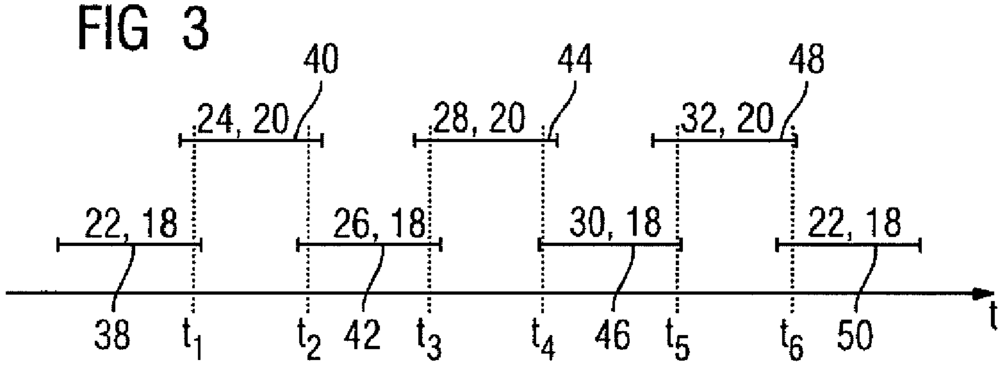
FIG. 3 illustrates one diagram of a number of transmission sequences from transmitters to receivers.

FIG. 3 shows seven transmission periods 38, 40, 42, 44, 46, 48, 50, in which different transmission parameters transmit a data stream. During a first transmission period 38, as described with respect to FIG. 1, a first section of the data stream is initially transmitted by a first pair of transmission units, embodied from the transmission units 18, 22. At the handover time $t_1$, the transmission of the data stream of the pairs of transmission units 18, 22 is handed over to the transmission units 20, 24, which now transmit the data stream to each other during a second transmission period 40. Around the handover time $t_1$, for example, during an overlapping period, both pairs of transmitters transmit the data stream simultaneously.

At handover time $t_2$, the transmission of the data stream is handed (transferred) over to a next pair of transmission units, such as the pair of transmission units 18, 26. The transmission units 18, 26 hand over the transmission of the data stream to a new pair of transmission units including the transmission units 20, 28 at handover time $t_3$. The handover times $t_1$, $t_2$ and $t_3$ may be selected by the control unit 16, so that the data transmission distance, for example, the optical distance, between a beam generation element and a beam receiving element of the relevant pair of transmission units is the same.

The selection of the handover times $t_1$, $t_2$ and $t_3$ is not mandatory. Handover times $t_4$, $t_5$ and $t_6$ may be selected in the same or in another mode or other transmission device.

Shortly after the transmission units 18, 30 have started the initially still redundant transmission of the data stream, a transmission sequence may be ended and a short pause may arise in the transmission of the data stream. The pause is used for the handover of the transmission of the data stream from the transmission period 44 into the transmission period 46. The handover time $t_4$ of the control unit 16 may be selected according to the transmission parameters, for example, so that, at handover time $t_4$, the distance between the pairs of transmission units 20, 28 is still greater than that between the pairs of transmission units 18, 30. A phase jump in the data transmission may not play any role in this case since the data transmission is currently paused.

In one embodiment, the transmission distance between the pairs of transmission units is unequal at the handover times $t_5$ and $t_6$. The control unit 16 may compare the phase angles of the data transmissions from the transmission periods 46 and 48 during the period of overlap. The handover times $t_5$, $t_6$ may be selected by the control unit 16 so that the phase jump disappears. With unequal distances of the pairs of transmission units at the handover times $t_5$, $t_6$ data transmission delays of further electrical and/or optical components may be compensated. The electrical and/or optical components, for example, could lead to a phase jump with an equal distance between the pairs of transmission units. The transmission delays may be avoided by comparing the two overlapping data streams. A position sensor 36 may be dispensed with since suitable handover times $t_5$, $t_6$ are determined on the basis of comparing the data streams. Handover times $t_5$, $t_6$ may be selected through a combination of data of the position sensor 36 and a comparison of the data transmission streams.

Figure 4:
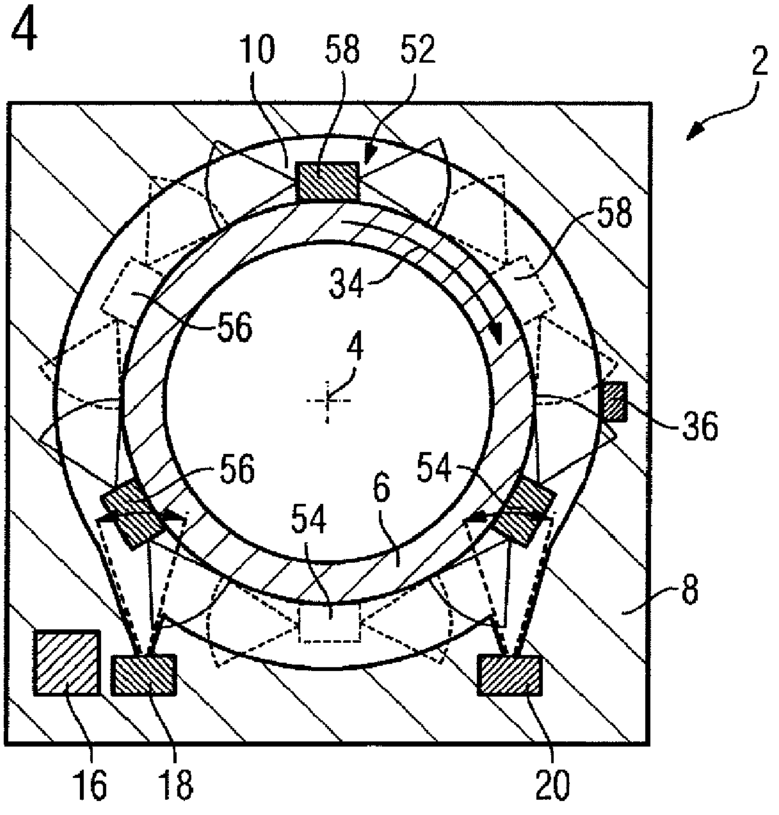
FIG. 4 illustrates another embodiment of the transmission device for transmission of data between the stator and the rotor.

FIG. 4 shows a computer tomography system 2 with an alternate transmission device 52 for transmission of data between the rotor 6 and the stator 8. In FIG. 4, components which remain the same relative to FIGS. 1-3 are labeled with the same reference numbers. The transmission device 52 includes two pairs of transmission units 18, 20 and three further transmission units 54, 56, 58 with beam splitters, which divide up into two opposite directions a beam of light from a beam generator element of the transmission units 54, 56, 58. The two beam splitters supply a transmit beam fanned out two-dimensionally by around 60°.

During a first transmission period a data stream is transmitted between rotor 6 and stator 8 of a pair of transmission units until they reach the position in relation to each other as depicted in FIG. 4 by the rotation of the rotor 6 in the direction of rotation 34. The transmission units may be transmission units 20, 54. The transmission of the data stream is handed over to a pair of transmission units, such as transmission units 18, 56, which transmit the data stream until such time as the transmitter 56 has reached the position indicated by a dashed line in FIG. 4. Now the transmission of the data stream is handed over to the pair of transmission units 20, 58, which hand over the data transmission to the pair of transmission units 18, 54. The transmission units 54, 56, 58 of the rotor 6 with each transmission unit 18, 20 of the stator 8 forms a pair of transmission units during a transmission period.

Figure 5:
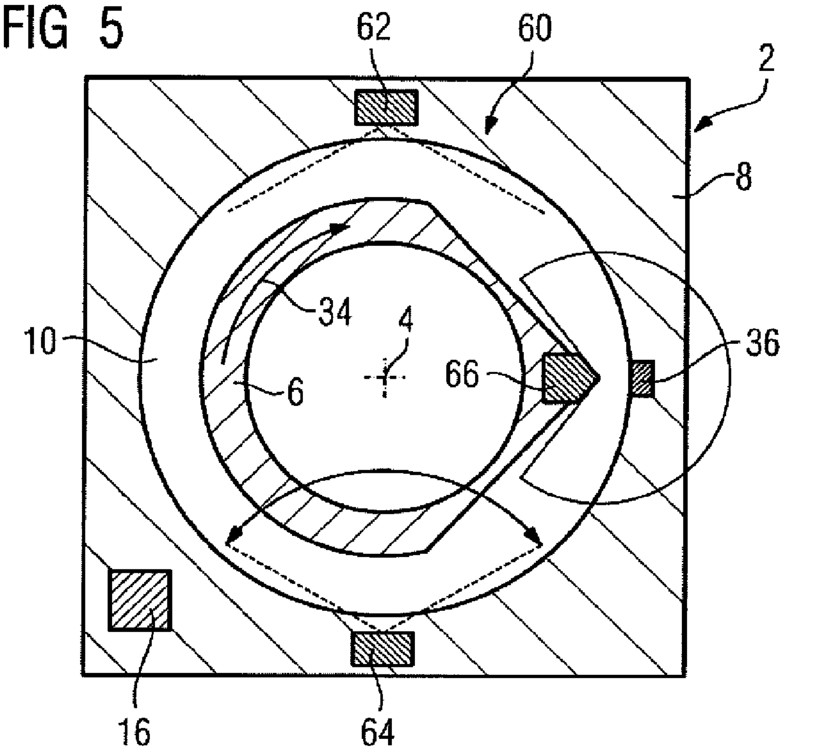
FIG. 5 illustrates another embodiment of the transmission device with only one transmitter on the rotor.

FIG. 5 shows a transmission device 60 that includes three transmission units 62, 64, 66 for transmission of the data between the rotor 6 and the stator 8. For example, a transmit beam of the transmission unit 66 is spread out in an angular area covering 240° two-dimensionally and a receive area of the transmission units 62, 64 covers an area of 120°. It is likewise conceivable for the transmission units 62, 64 to be transmitters and for the transmission unit 66 to be a receiver. The transmission of the data stream alternates between a pair of transmission units including the transmission units 64, 66 and a pair of transmission units including the transmission units 62, 66.

Figure 6:
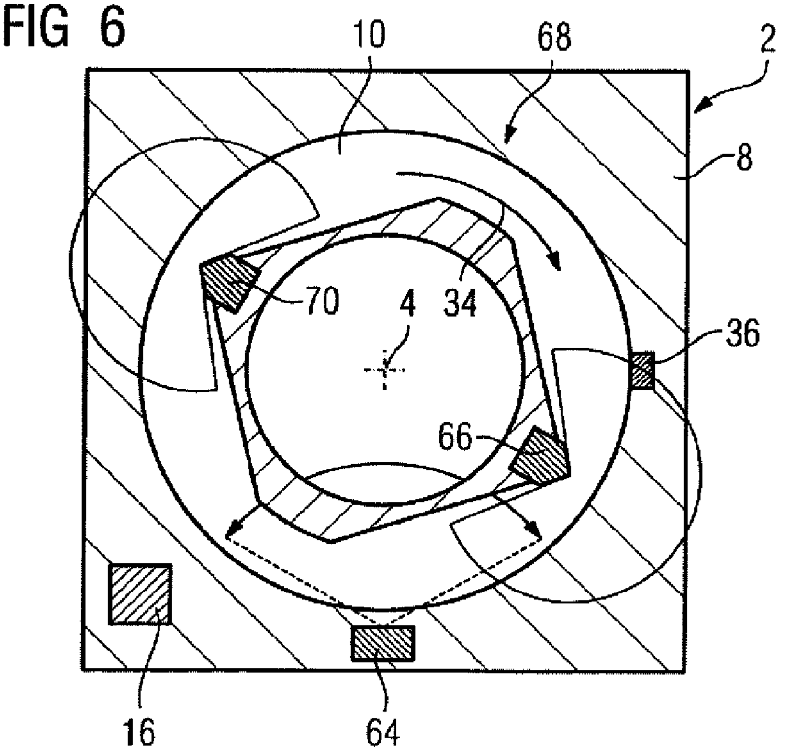
FIG. 6 illustrates another embodiment of the transmission device with only one transmitter on the stator.

FIG. 6 shows a modified transmission device 68 that includes three transmission units 64, 66, 70. The transmission device 68 alternates transmission of the data from the transmission units 64, 66 and 64, 70.

Figure 7:
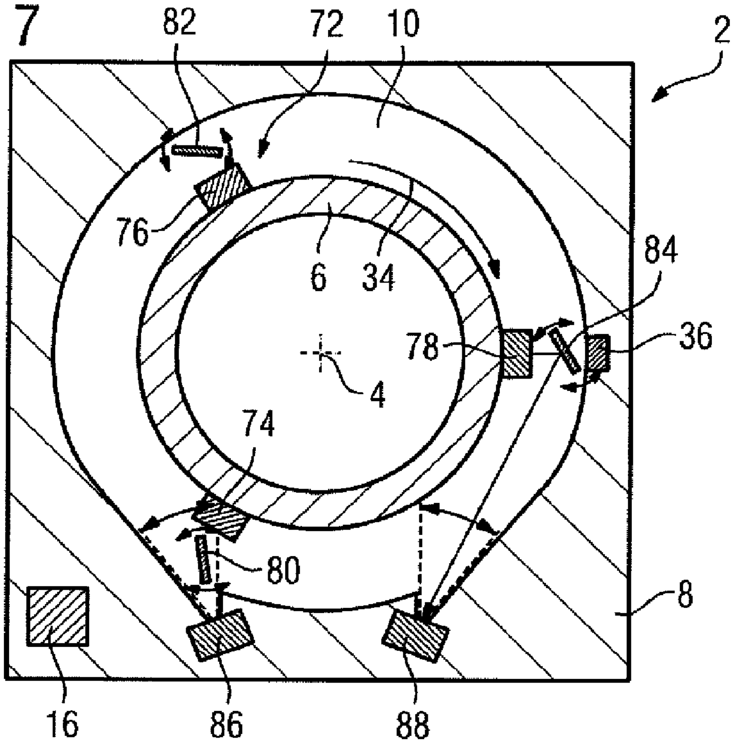
FIG. 7 illustrates another embodiment of the transmission device with pairs of transmission units on the rotor and a moveable beam deflector element.

FIG. 7 shows a transmission device 72 with a high coupling efficiency. The active transmitter-receive pair may be sent out by the transmission units 74, 76, 78, which are transmitters collimated, for example, being diverted by a moveable beam deflection element 80, 82, 84 of the transmission units 74, 76, 78 optimally to the transmission units 86, 88 implemented as receivers. In one embodiment, the beam deflector elements 80, 82, 84 may be diffractive, refractive or reflective, depending on how the beam is to be diverted and/or formed. The beam deflection elements 80, 82, 84 may be rotated around an axis, which is parallel to the axis of rotation 4 of the rotor 6, under the control of the control unit 16. A beam of light, which is sent out by the transmitters while the transmission units 74, 76, 78, 86, 88 are in a transmission position in relation to one another, may be diverted directly into the receivers.

In one embodiment, the moveable mirrors may be piezo-operated mirrors or galvo mirrors. The piezo-operated mirrors or galvo mirrors may be used for labeling and may be moved rapidly using magnetic fields. The alignment of the beam deflection elements 80, 82, 84 may be controlled on the basis of the angular position of the rotor 6, which is determined, for example, by the position sensor 36 in collaboration with the control unit 16. The alignment may be controlled to an optimum transmission efficiency by a closed-loop control circuit. The transmission efficiency may be a signal strength or a signal quality. The beam deflection element 80, 82, 84 is set by the control unit 16 so that the received signal strength reaches a maximum, for example. The setting may include a corresponding movement in a number of degrees of freedom, especially a rotation around at least two axes independent of one another.

Figure 8:
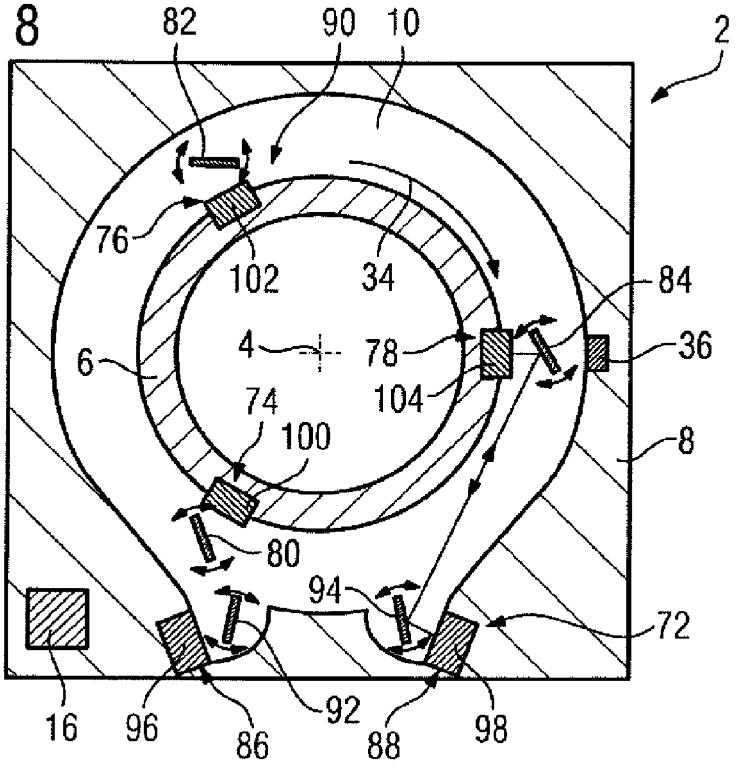
FIG. 8 illustrates another embodiment of the transmission device in which the transmission units on the stator include moveable beam deflector elements.

FIG. 8 shows a transmission device 90. The transmission device 90 includes the beam deflection elements 80, 82, 84, and further beam deflection elements 92, 94 for focused deflection of the signal beam into beam receiver elements 96, 98 of the transmission units 86, 88 or from the latter into the beam receiver elements 100, 102, 104 of the transmission units 74, 76, 78. Instead of or in addition to focusing, depending on beam deflection elements 92, 94, a collimation and other beam processing operations may be performed.

The transmission units 74, 76, 78, 86, 88 may be transceivers, such as transmitters and also as receivers. The transmission units 74, 76, 78, 86, 88 may enable transmission over the identical optical path from the rotor 6 to the stator 8 and simultaneously from the stator 8 to the rotor 6. Beam transmitting elements 96, 98, 100, 102, 104 may be beam receiving elements. Unidirectional data transmission may be also possible.

The control unit 16 may be self-learning. The control unit 16 may execute a learning process in which, for a plurality of angular positions of the rotor 6, the optimum alignment of the beam deflection elements 80, 82, 84, 92, 94 is determined by a control loop and these alignments are automatically assumed again during operation for the individual angular positions. For positions between the measured angular positions, a corresponding interpolated orientation may be assumed from an adjacent alignment. Even with a rapid rotation of the rotor 6, the transmit beam is efficiently coupled into the corresponding transmission unit 74, 76, 78, 86, 88. The learning process, for adapting the system to the respective ambient conditions, such as changes of form and position or temperature and humidity, for example, may be repeated at specific intervals.

Figure 9:
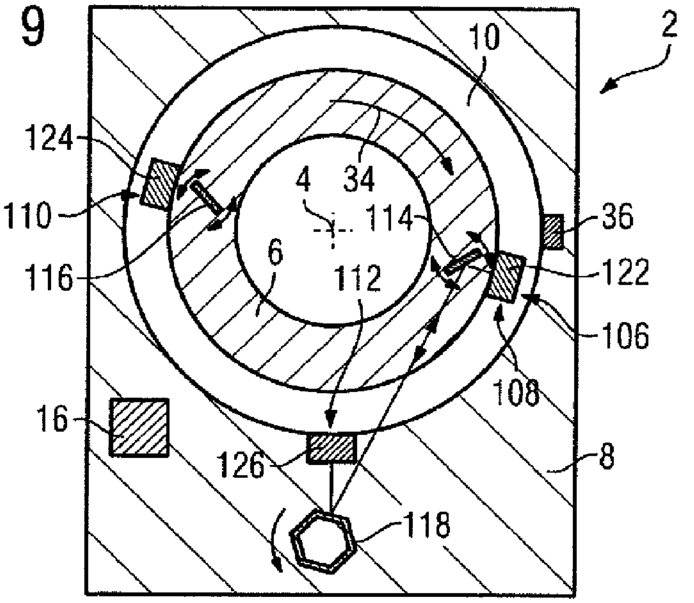
FIG. 9 illustrates another embodiment of the transmission device in which the beam deflector elements of the rotor are arranged radially within the beam generation or beam receiving elements of the transmission units.
Figure 10:
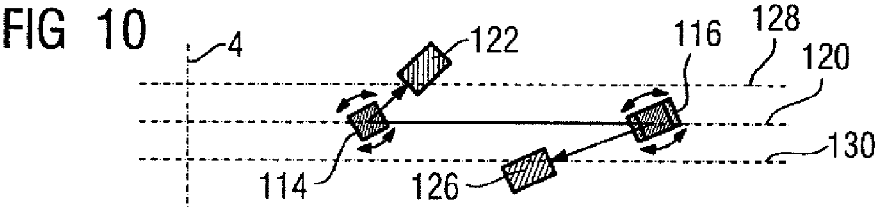
FIG. 10 illustrates another diagram showing the arrangement of the beam deflector elements perpendicular to the axis of rotation of the rotor.

FIG. 9 shows a transmission device 106. The transmission device 106 may include only three transmission units 108, 110, 112. The beam deflection elements 114, 116, 118 may be arranged in another plane 120 (FIG. 10) perpendicular to the axis of rotation 4 of the rotor 6 as beam generator elements 122, 124 and a beam receiving element 126 of the transmission units 108, 110, 112. The beam generator elements 122, 124 may be arranged in one plane 128 and the beam receiving element 126 in another plane 130, as is shown in FIG. 10. The beam generation elements 122, 124 may be arranged in the same plane 128 as the beam receiving element 126. The beam deflection elements 114, 116, 118 may not be covered by the beam generator elements 122, 124 or by the beam receiving element 126, respectively, so that the transmitter 108 may be moved past the transmitter 112 without any interruption in the data transmission.

The beam deflection elements 114, 116, 118, as depicted by the double arrows on the beam deflection elements 114, 118 in FIG. 10, may be able to be rotated around an axis of which the direction is different from the direction of the axis of rotation 4 of the rotor 6 and is perpendicular to this direction of the axis of rotation 4 of the rotor 6. The beam deflection elements 114, 116, 118 (e.g., like the beam deflection elements 82, 84, 92, 94 of the previous figures) may be rotatable around a third axis and include translational degrees of freedom.

The beam deflection element 118 may be a polygon mirror with six outer mirrors at an angle to each other. The beam deflection element 118 may provide continuous movement without interrupting data transmission.

Figure 11:
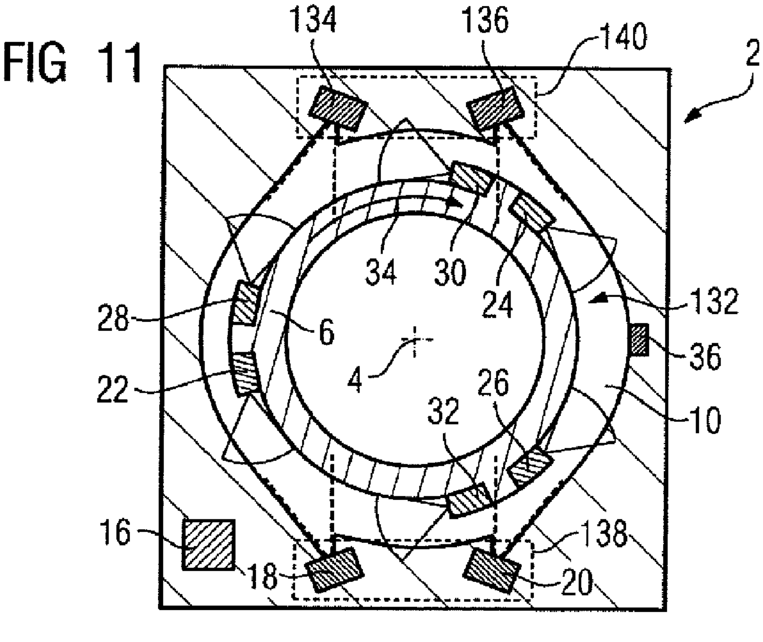
FIG. 11 illustrates another embodiment of the transmission device for multiplexing.

In one embodiment, as shown in FIG. 11, a transmission device 132 includes two further transmission units 134, 136. The transmission units 18, 20 are combined into a transmission unit 138 and the transmission units 134, 136 into a transmission unit 140. The transmission units 138, 140 are used for transmission in different data channels on which different data streams are transmitted simultaneously.

While the transmission unit 138, shown in FIG. 11, transmits a first data stream on a first data channel, the transmission unit 140 simultaneously transmits a second data stream on the second data channel. The transmission units 22 to 32 may transmit the two data streams and, depending on the transmission position in relation to one of the transmission units 138, 140, have the corresponding data stream applied to them by the control unit 16. Depending on the volume of data to be transmitted additional transmission units may be provided.

The present embodiments are not restricted to the exemplary embodiments shown. Individual elements and characteristics of individual exemplary embodiments may be integrated into other exemplary embodiments.

The invention claimed is:

1. A transmission device for transmission of data between a rotor and a stator, the transmission device comprising:

a first pair of transmission units and a second pair of transmission units, one of the first pair of transmission units and the second pair of transmission units being a transmitter and the other of the first pair of transmission units and the second pair of transmission units being a receiver, one of the transmitter and the receiver being arranged on the rotor and the other of the transmitter and the receiver being arranged on the stator; and a control unit configured to control a handover time as a function of a relative phase angle between the first pair of transmission units and the second pair of transmission units, wherein the first pair of transmission units and the second pair of transmission units are arranged in relation to each other so that, when the rotor is rotating, at the handover time, transmission units of a pair of transmission units moving towards each other and transmission units of the other pair of transmission units moving away from each other are in a transmission position in relation to one another.

2. The transmission device as claimed in claim 1, wherein the control unit alternately includes the pair of transmission units with the transmission units moving towards each other and the pair of transmission units with the transmission units moving away from each other for data transmission.

3. The transmission device as claimed in claim 1, wherein the control unit is operable to control the handover time so that at the handover time, transmission units of the first pair of transmission units and the second pair of transmission units are at the same distance from each other.

4. The transmission device as claimed in claim 1, further comprising a position sensor operable to detect a relative position of the rotor in relation to the stator, the control unit operable to control the handover time as a function of a signal of the position sensor.

5. The transmission device as claimed in claim 1, wherein the transmitter is an optical transmitter that emits a transmit beam in, against, or in and against a direction of rotation of the rotor.

6. The transmission device as claimed in claim 1, wherein at least one transmission unit of the first pair of transmission units and the second pair of transmission units includes a beam deflection element movable relative to the rotor, the stator, or the rotor and the stator.

7. The transmission device as claimed in claim 6, wherein the beam deflection element is movable relative to a beam generation element or a beam receiving element of the at least one transmission unit.

8. The transmission device as claimed in claim 7, wherein the beam deflection element is rotatable around an axis perpendicular to an axis of rotation of the rotor.

9. The transmission device as claimed in claim 8, wherein the control unit is configured to use a closed-loop control circuit to align the beam deflection element to an optimum transmission efficiency.

10. The transmission device as claimed in claim 9, wherein the control unit is a self-learning device that is operable to determine optimum alignments of the beam deflection element for different angular positions of the rotor and to control an alignment of the beam deflection element in accordance with the different angular positions of the rotor.

11. The transmission device as claimed in claim 1, wherein the first pair of transmission units and the second pair of transmission units are arranged in different planes perpendicular to an axis of rotation of the rotor.

12. The transmission device as claimed in claim 1, wherein the control unit is operable to transmit at least two different data channels over at least one transmission unit of the first pair of transmission units and the second pair of transmission units.

13. The transmission device as claimed in claim 1, wherein at least one transmission unit of the first pair of transmission units and the second pair of transmission units is operable to transmit at least two data channels of different carrier frequency.

14. The transmission device as claimed in claim 1, wherein the control unit controls the handover time as a function of phase equality.

15. The transmission device as claimed in claim 12, wherein the at least two different data channels are transmitted sequentially.

16. A medical imaging system comprising:

a gantry having a rotor and a stator; and a transmission system for transmission of data between the rotor and the stator, the transmission system including:

two pairs of transmission units, a first pair of transmission units of the two pairs of transmission units being a transmitter arranged on the stator or the rotor, and a second pair of transmission units of the two pairs of transmission units being a receiver arranged opposite the transmitter; and a control unit configured to control a handover time as a function of a relative phase angle between the first pair of transmission units and the second pair of transmission units, wherein the two pairs of transmission units are arranged in relation to each other so that, when the rotor is rotating, at a handover time, transmission units of a pair of transmission units moving towards each other and transmission units of the other pair of transmission units moving away from each other are in a transmission position in relation to one another.

* * * * *